US008913710B2

(12) United States Patent
Star-Lack et al.

(10) Patent No.: US 8,913,710 B2
(45) Date of Patent: Dec. 16, 2014

(54) TRUNCATION CORRECTION IMAGING ENHANCEMENT METHOD AND SYSTEM

(75) Inventors: Josh Star-Lack, Palo Alto, CA (US); Mingshan Sun, Menlo Park, CA (US); John Milan Pavkovich, Palo Alto, CA (US)

(73) Assignee: Varian Medical Systems, Inc., Palo Alto, CA (US)

( * ) Notice: Subject to any disclaimer, the term of this patent is extended or adjusted under 35 U.S.C. 154(b) by 625 days.

(21) Appl. No.: 13/095,108

(22) Filed: Apr. 27, 2011

(65) Prior Publication Data

US 2012/0275673 A1    Nov. 1, 2012

(51) Int. Cl.
G06K 9/00 (2006.01)
G06T 11/00 (2006.01)

(52) U.S. Cl.
CPC ......... *G06T 11/005* (2013.01); *G06T 2211/412* (2013.01); *G06T 2211/432* (2013.01)
USPC .............................................. 378/4; 382/131

(58) Field of Classification Search
CPC ................................................ G06T 2211/432
USPC .............................................................. 378/4
See application file for complete search history.

(56) References Cited

U.S. PATENT DOCUMENTS

| 6,539,074 | B1 | 3/2003 | Yavuz et al. |
| 2004/0234115 | A1 | 11/2004 | Zijp et al. |
| 2006/0133564 | A1 | 6/2006 | Langan et al. |
| 2006/0245536 | A1* | 11/2006 | Boing et al. ..................... 378/8 |
| 2006/0262895 | A1* | 11/2006 | Kawachi et al. .................. 378/4 |
| 2007/0167707 | A1 | 7/2007 | Mistretta et al. |
| 2008/0219535 | A1 | 9/2008 | Mistretta et al. |
| 2009/0016592 | A1* | 1/2009 | Hoppe et al. .................. 382/131 |
| 2010/0021033 | A1* | 1/2010 | Bruder et al. ................. 382/131 |
| 2010/0195931 | A1* | 8/2010 | Teshigawara et al. ........ 382/280 |
| 2011/0044559 | A1* | 2/2011 | Erhard et al. ................. 382/275 |
| 2011/0081068 | A1 | 4/2011 | Brinks et al. |
| 2012/0275657 | A1 | 11/2012 | Kolthammer et al. |
| 2012/0314921 | A1 | 12/2012 | Star-Lack et al. |
| 2013/0028495 | A1 | 1/2013 | Star-Lack et al. |

OTHER PUBLICATIONS

Berhard et al., Image Artifact Reduction, Nov. 2009, WO2009/136347.*
Mezin et al., Metal Artifact Reduction Algorithm for X-Ray CT Using a Three-Pass Approach, Jun. 2009, Medical Physics, vol. 36, No. 6, p. 2432. (See SU-EE-A4-03).*

(Continued)

*Primary Examiner* — Hoon Song
*Assistant Examiner* — Danielle Fox
(74) *Attorney, Agent, or Firm* — SU IP Consulting

(57) ABSTRACT

In accordance with at least some embodiments of the present disclosure, a process for enhancing an image is presented. The process may include receiving a first plurality of projections, wherein the first plurality of projections contain computed tomography (CT) data obtained in multiple motion phases and also image data attributable to a first portion of a scanned object. The process may include expanding the first plurality of projections to cover at least the first portion of the scanned object to generate a second plurality of projections. The process may further include generating a phase-correlated image based on a multi-phase image and a phase-correlated difference image, wherein the multi-phase image is reconstructed based on the second plurality of projections, and the phase-correlated difference image is reconstructed based on the first plurality of projections and the second plurality of projections.

21 Claims, 7 Drawing Sheets

(56) References Cited

OTHER PUBLICATIONS

Ziyi Zheng et al., "Fast 4D Cone-Beam Reconstruction Using the McKinnon-Bates Algorithm with Truncation Correction and Non Linear Filtering," Proc. SPIE 7961, 79612U, Mar. 2011.

Shuai Leng et al., "Streaking artifacts reduction in four-dimensional cone-beam computed tomography," Med. Phys., Oct. 2008, 4649-4659, vol. 35, No. 10, Am. Assoc. Phys. Med.

Graeme C. Mc Kinnon et al., "Towards Imaging the Beating Heart Usefully with a Conventional CT Scanner," IEEE Transactions on Biomedical Engineering, Feb. 1981, 123-127, vol. BME-28.

Kathryn L. Garden et al., "3-D Reconstruction of the Heart from few Projections: A Practical Implementation of the McKinnon-Bates Algorithm," IEEE Transactions on Medical Imaging, December 1986, 233-239, vol. MI-5, No. 4.

Notification of Transmittal of the International Search Report and The Written Opinion of the International Searching Authority, International Application No. PCT/US12/40654, Oct. 22, 2012.

Adrian N. Evans et al., "Biased Motion-Adaptive Temporal Filtering for Speckle Reduction in Echocardiography", IEEE Transactions on Medical, Imaging, Feb. 1996, pp. 39-50, vol. 35, No. 3.

* cited by examiner

TRUNCATION CORRECTION IMAGING ENHANCEMENT METHOD AND SYSTEM

BACKGROUND OF THE DISCLOSURE

1. Field of the Disclosure

Embodiments of the present disclosure relate generally to image processing technologies and more specifically to truncation correction imaging enhancement methods and systems.

2. Description of the Related Art

Unless otherwise indicated herein, the approaches described in this section are not prior art to the claims in this application and are not admitted to be prior art by inclusion in this section.

Computed tomography (CT) has been a widely used imaging technique. However, when a CT medical imaging device takes an insufficient number of samples aliasing artifacts such as streaks may appear in the reconstructed images. Cone-beam computed tomography (CBCT), which involves the use of wide area detectors, is more susceptible to undersampling problems because data frame rates are slower.

One challenge for medical cone-beam computed tomography is to manage respiratory motion. Due to the relatively slow gantry rotation times, it is very difficult to acquire a full CBCT data set in a single breath hold, much less in a single respiratory phase (e.g., inspiration or expiration). However, because motion is periodic, a 4-D image (3 spatial dimensions and 1 time dimension) can be obtained by grouping the acquired CBCT projections by respiratory phase and reconstructing a distinct 3-D image for each phase. In many cases, due to the sparse or "wagon-wheel" projection sampling distributions associated with each respiratory phase, aliasing artifacts, including streaks emanating from bones, are often introduced. While it is possible to reduce these artifacts by slowing down the gantry rotation rate thus reducing the distance between adjacent wagon-wheel spokes, there are substantial costs associated with lengthening the imaging times and delivering higher doses of radioactive X-rays.

Another challenge for CT image reconstruction is that during the scanning of a patient, other objects, such as a patient table, may also lead to streaks in reconstructed images. For instance, a portion of the patient table may be truncated, and this truncated portion is not included as a part of all the acquired projections. The truncated portion, causing incomplete and inconsistent data, may thus contribute to the occurrence of streaks or other artifacts in the reconstructed images.

DETAILED DESCRIPTION

Figure 1:
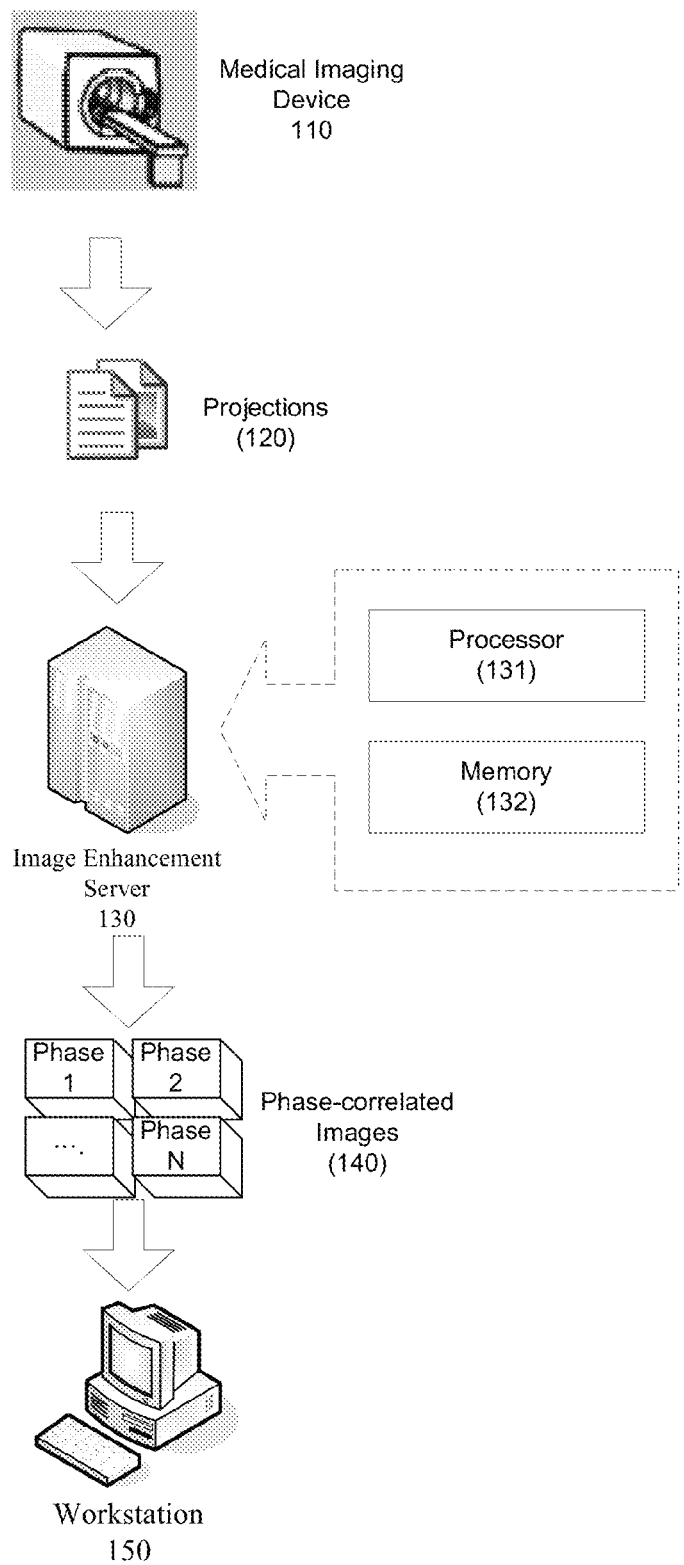
FIG. 1 shows a block diagram illustrating one embodiment of a system configured to enhance an image.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

Throughout the disclosure, the terms "image" and "reconstructed image" are used interchangeably to broadly refer to a set of data that graphically represents a physical object or a person. For example, a 3D image of a patient's heart may be reconstructed based on a set of 2D x-ray projections taken through the heart and its surrounding anatomy by a medical imaging device. Similarly, by processing a set of sinograms associated with a section of a patient's body, a cross-section image of the patient's body may be generated.

Throughout the disclosure, the term "multi-phase" may broadly refer to multiple motion phases (e.g., respiratory phases such as inspiration and expiration, cardiovascular phases such as diastole and systole, muscular phases such as concentric contraction and eccentric contraction, and others). The term "phase-correlated" may broadly characterize data that are organized based on the multiple motion phases. For example, a set of phase-correlated images may be sorted based on the number of respiratory phases and/or the sequence in which the respiratory phases occur. Alternatively, the phase-correlated images may be sorted based on the types of respiratory phases. That is, one of the phase-correlated images may be associated with all the inspiration phases, while another one of the phase-correlated images being associated with all the expiration phases.

FIG. 1 shows a block diagram illustrating one embodiment of a system configured to enhance an image. In particular, one or more medical imaging devices 110 may generate projections 120, which an image enhancement server 130 may process and generate a set of phase-correlated images 140. The phase-correlated images 140 may then be transmitted to one or more workstations 150 for displaying and further processing.

Some examples of the medical imaging device 110 may include, without limitation, an X-ray device, CT device, Magnetic Resonance Imaging device, and others. The medical imaging device 110 may have one or more detectors that can detect signals from various angles and distances.

In some embodiments, the image enhancement server 130 may perform one or more image enhancing operations to the projections 120 so that artifacts in the phase-correlated images 140 may be reduced. An example image enhancement server 130 may include one or more processors 131, memory 132, and/or other components, so that it could process the projections 120. Similarly, an example workstation 150 may also include one or more processors, memory, and/or other components (not shown), so that it could process the phase-correlated images 140. It should be apparent to a person having ordinary skills in the art to recognize that the image enhancement server 130 and the work station 150 may correspond to the same computing device. It may also be possible that some or all of the functionalities supported by the image enhancement server 130 and the workstation 150 are implemented as a part of the medical imaging device 110.

In some embodiments, the processor(s) 131 of the image enhancement server 130 may include central processing units (CPUs) for controlling the overall operation of the image enhancement server 130. The processor(s) 131 may accomplish this by executing software or firmware stored in memory 132. The processor(s) 131 may be or may include, one or more programmable general-purpose or special-purpose microprocessors, digital signal processors (DSPs), programmable controllers, application specific integrated circuits (ASICs), programmable logic devices (PLDs), graphical processing units (GPUs) or the like, or a combination of such devices. The memory 132 may represent any form of random access memory (RAM), read-only memory (ROM), flash memory (as discussed above), or the like, or a combination of such devices. In use, the memory 132 may contain, among other things, a set of machine readable instructions which, when executed by the processor 131, causing the processor 131 to perform at least some embodiments of the present disclosure.

In some embodiments, the workstation 150 may be a computer device with sufficient resources (e.g., graphics cards, memory, hard-drive, fast network connectivity, and others) to perform multi-dimensional image rendering and display the rendered phase-correlated images 140. The workstation 150 may also be installed with visualization software and tools for advanced editing and processing of the phase-correlated images 140. The details of the projections 120, the image enhancement server 130, and the phase-correlated images 140 are further described below.

Figure 2:
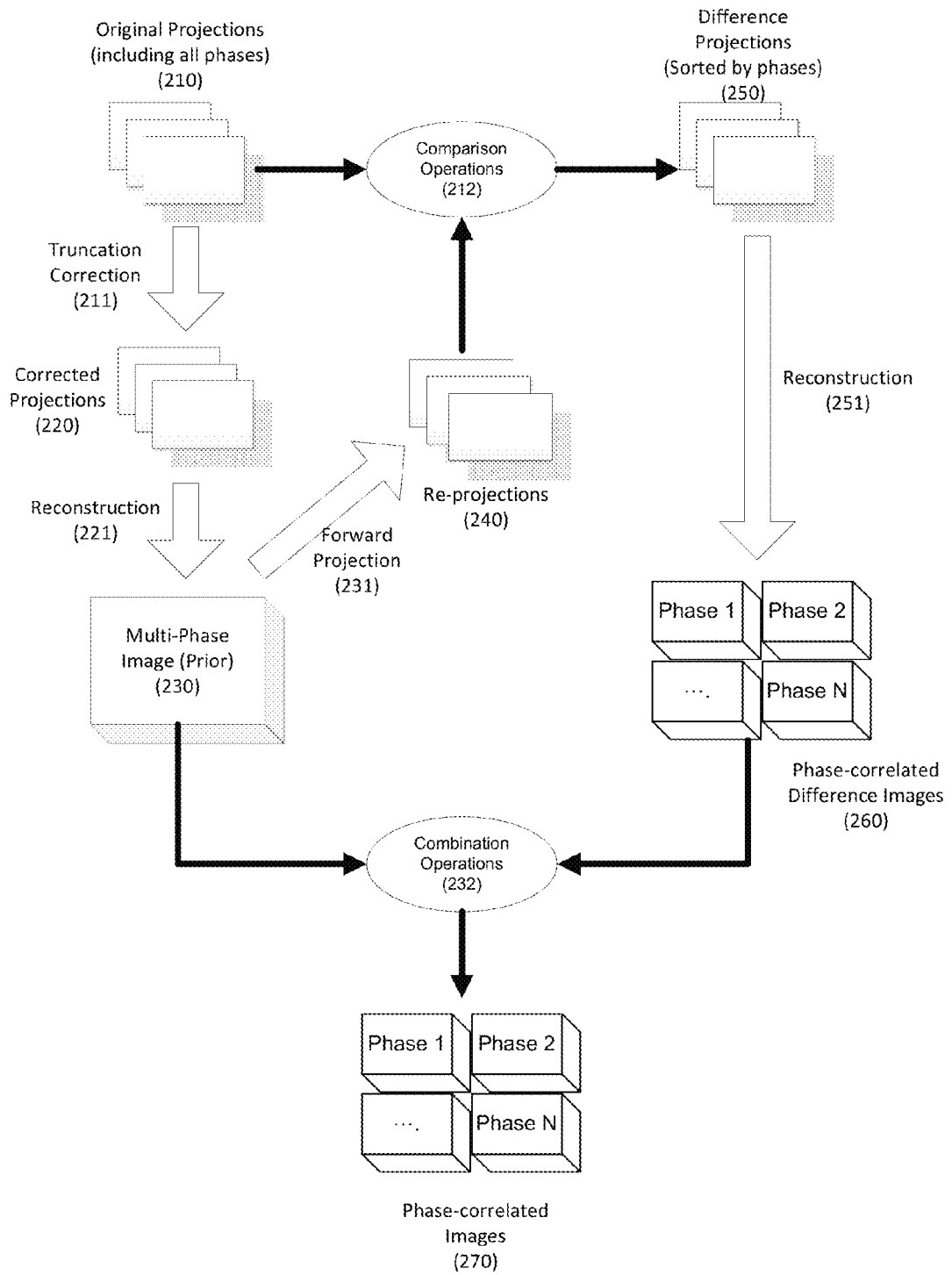
FIG. 2 shows a flow diagram illustrating one embodiment of a process for generating one or more phase-correlated images.

FIG. 2 shows a flow diagram illustrating one embodiment of a process for generating one or more phase-correlated images. In FIG. 2, a set of original projections 210 may be obtained from a medical imaging device such as the medical imaging device 110 of FIG. 1. The original projections 210 may contain computed tomography (CT) data obtained in multiple motion phases (e.g., multiple respiratory, cardiovascular, or muscular phases. The original projections 210 may then be processed by an image enhancement server such as the image enhancement server 130 of FIG. 1.

In some embodiments, the medical imaging device may truncate some of the detected data associated with an object during the generation of the original projections 210, regardless whether or not the geometry and the detector size of the medical imaging device enable the entire object-of-interest to be scanned. For example, a patient (i.e., the object-of-interest) may be lying on a patient support during the scanning operation. The patient may be contained within the imaging device's field-of-view (FOV), but a portion of the support may be truncated and not included as a part of some or all of the original projections 210. The portion of patient support that is not included in the original projections 210 may still affect the subsequent processing of the original projections 210, and this portion is also referred to as a truncated portion or a truncated object throughout the present disclosure.

In some embodiments, a truncation correction operation may be utilized to adjust the spatial extent of the original projections 210 and generate a set of corrected projections 220 to address the influences attributable to the truncated portion. An exemplary truncation correction approach may be to perform a large field-of-view reconstruction to create an expanded volume beyond the nominal projection space of the original projections 210. Another exemplary truncation correction approach may be to perform a large field-of-view subtraction to remove the truncated objects that may cause artifacts. Yet another example truncation correction approach may be to use a filter to reduce or remove the truncated objects. The details of the aforementioned example truncation correction operations are further described below.

In some embodiments, the truncation correction operation 211 may adopt the large field-of-view reconstruction approach mentioned above and expand the original projections 210 to generate the corrected projections 220. Specifically, the corrected projections 220 may contain extrapolated data that are positioned beyond the projection space of the original projections 210. Since the truncation may occur either in transaxial or axial direction, the data expansion to correct the truncation may also occur transaxially or axially, respectively. The details about the truncation correction operation 211 are further described below.

In some embodiments, a reconstruction operation 221 employing a filtered back-projection algorithm, such as the Feldkamp, Davis, and Kress (FDK) algorithm, may be utilized to generate a multi-phase image 230 from the corrected projections 220. The multi-phase image 230 may also be referred to as a "prior" image. If the original projections 210 are used for reconstruction, then the multi-phase image 230 may have a nominal field of view ("FOV"), and any information associated with a truncated portion of a scanned object may not be properly represented in the original projections 210 and may not be properly reflected in the multi-phase image 230. However, when using the corrected projections 220 to reconstruct the multi-phase image 230, the multi-phase image 230 may have an extended FOV that encompasses the entire scanned object.

In some embodiments, the multi-phase image 230 may be forward-projected (231) to generate a set of re-projections 240. The re-projections 240 may be generated using the same configurations that are utilized by the medical imaging device for generating the original projection 210. For example, the image enhancement server may simulate the projection acquisition operations (e.g., the forward-projection operation 231) on the multi-phase image 230 based on the same scanning angles and exposure periods of the medical imaging device to generate the estimated re-projections 240. In other words, the original projections 210 are measured based on a physical structure (e.g., a patient's body), while the re-projections 240 are estimated and/or simulated projections based on a virtual structure reconstructed in the multi-phase image 230.

In some embodiments, the re-projections 240 and the original projections 210 may have the same number of projection frames and cover the same number of motion phases. Further, each of the re-projections 240 may correspond to each of the original projections 210 (e.g., generated in the same motion phase, from the same angle, and other configuration parameters) and thus may be meaningfully compared with one another.

In some embodiments, the original projections 210 and the re-projections 240 may be processed by one or more comparison operations 212 to generate a set of difference projections 250. In some instances, the difference projection 250 may show no difference in some areas (e.g., no difference in pixel values), indicating lack of motion in these areas during the acquisition of the original projections 210. Areas in the difference projection 250 may show significant differences, on the other hand, indicate locations of motion during the collection of the original projections 210.

Moreover, as mentioned above, the information associated with a truncated portion of a scanned object may lead to artifacts in a reconstructed image, such as the multi-phase image 230. The multi-phase image 230 may then be forward-projected (231) to generate the re-projections 240. By performing one or more comparison operations 212 between the original projections 210 and the re-projections 240 the difference projections 250 may also include the differences that are attributable to the truncated portion of the scanned object in addition to any motion-related information.

In some embodiments, the difference projections 250 may then be sorted by motion phases, and a reconstruction operation 251 may be performed to generate a set of phase-correlated difference images 260 from the difference projections 250. The difference projections 250 that belong to a certain inspiration or expiration phase may be used in the reconstruction operation 251, which may be similar to the reconstruction operation 211, to reconstruct a difference image 260. For example, assuming there are 600 original projections 210 collected during 5 inspiration phases and 5 expiration phases. The forward-projection operation 231 may generate 600 re-projections 240 corresponding to the 600 original projections 210. Subsequently, the comparison operations 212 may result in 600 difference projections 250, which may be sorted in the order of the 5 inspiration and 5 expiration phases. The sorted difference projections 250 may then be relied upon to reconstruct 10 phase-correlated difference images 260.

In some embodiments, the image enhancement server or a separate server may perform one or more combination operations 232 between the multi-phase image 230 and the phase-correlated difference images 260 to generate a set of phase-correlated images 270. As an example, each of the phase-correlated difference images 260 may be subtracted from the multi-phase image 230 to generate one of the phase-correlated images 270.

Figure 3:
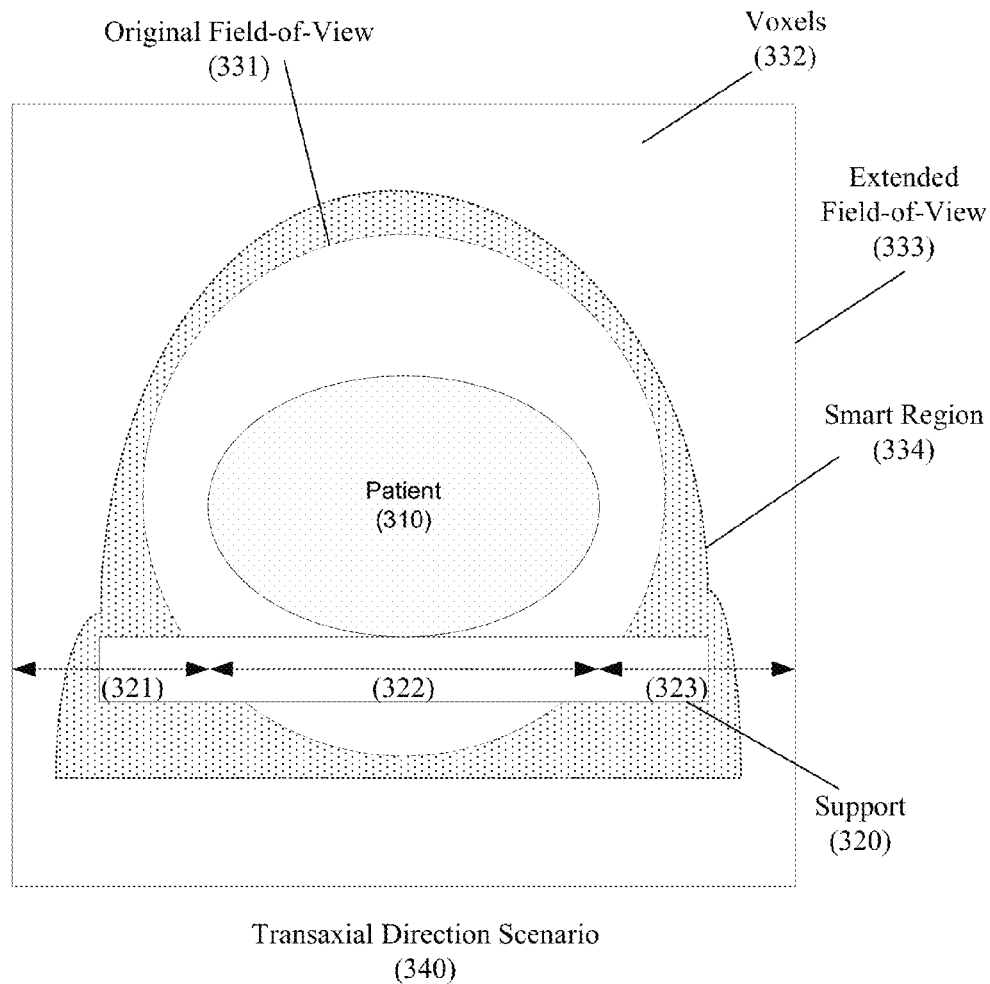
FIG. 3 shows scenarios illustrating various embodiments of the large field-of-view reconstruction approach.
Figure 3:
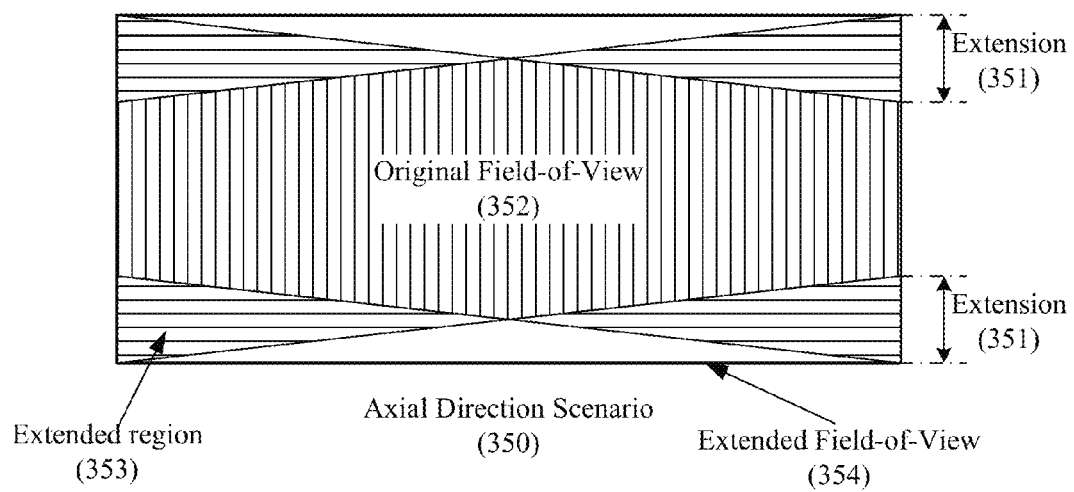

FIG. 3 shows scenarios illustrating various embodiments of the large FOV reconstruction approach. Specifically, FIG. 3 includes a transaxial direction scenario 340 and an axial direction scenario 350, both of which have a portion of a patient and/or a support truncated in the transaxial and axial direction, respectively. In the large FOV reconstruction approach, the projection data may be extrapolated to create a reconstruction volume that is expanded beyond the nominal FOV defined by the detector geometries of a medical imaging device.

The scenario 340 shows a cross-sectional view of a patient 310 lying on the top of a support 320 (e.g., a table) in a transaxial direction. A medical imaging device may scan the patient 310 and the support 320, and generate a set of original projections within a projection space similar in size and shape of a circle 331, also referred to as an original or a nominal FOV 331. Any projection data outside of the circle 331 may be truncated by the medical imaging device. Subsequently, the multi-phase prior image that is reconstructed based on these original projections may also have a nominal FOV that is similar to the circle 331. In the scenario 340, at least a portion of the support 320 may be outside of the circle 331 and may be truncated. The large FOV reconstruction approach may expand the projection space of the original projections by extrapolating the projection data. As a result, the prior image generated based on the extrapolated projections may have an extended FOV (represented by the rectangle 333). The part of the support 320 that is truncated in the nominal FOV 331 may be covered in the extended FOV 333.

In some embodiments, in the transaxial direction, the extended FOV 333 may be reconstructed based on extrapolating projection data to simulate the truncated objects. Extrapolation refers to the construction of new data outside of a set of known data, using the set of known data. In the scenario 340, the extrapolation process may construct new projection data for a region 321 and a region 323 based on the projection data in a region 322 (the region 322 is inside of the nominal FOV 331). For example, the first valid detector pixel to the last valid detector pixel in the extended region 321, or the "wrap-around" region below the region 321, may be extrapolated using the pixel values located in the region 322.

In some embodiments, the regions 321 and 323 may be expanded using a linear extrapolation approach. Assuming that for a row d, there are N valid columns of projection data that are inside of the nominal FOV 331, and the extrapolation process may expand the detector of the medical imaging device to form a new detector d' with twice as many columns of projection data, Thus, there may be 2N columns of projection data for row d after the extrapolation process. In this case, the original elements in the row d may be denoted as d(1:N), with d(1) referring to the left-most pixel, and d(N) referring to the right-most pixel in the region 322. The extrapolated columns in the left region 321 may be denoted as d'(1:N/2), with d'(1) referring to the left-most pixel, and d'(N/2) referring to the right-most pixel in the region 321. The extrapolated volumes in the right regions 323 may be denoted as d'(3(N/2)+1:2N), with d'(3N/2+1) being the left-most pixel, and d'(2N) being the right-most pixel in the region 323.

The extrapolated pixel value for each of the columns in the region 321 may be determined as the following:

$$d'(i) = \frac{i}{\left(\frac{N}{2}\right)} * d(1) + \left(1 - \frac{i}{\frac{N}{2}}\right) * d(N)$$

$$i = 1 \text{ to } \left(\frac{N}{2}\right).$$

The extrapolated value for each of the columns in the region 323 may be determined as the following:

$$d'(i)=(i-3N/2)/(N/2)*d(1)+(1-(i-3N/2)/(N/2))*d(N)$$
$$i=3(N/2)+1 \text{ to } 2N$$

Thus, the above extrapolation process may allow sufficient projection data to be extrapolated in the regions 321 and 323 that could be used to cover the portions of the support 320 that are outside of the nominal FOV 331 (in other words, the truncated portions). After each row in the original projections are extrapolated based on similar linear extrapolation formulas as the above, the reconstructed prior image may have an extended FOV encompassing the portions of the scanned object that may have been truncated.

In some embodiments, another means of expanding the FOV in the transaxial direction is to extrapolate the edge pixel values down to zero using linear or nonlinear methods with slopes, based on assumptions about the shape of the object. Since the shape and position of the support are known a priori, the extrapolation process may be tailored based on the known shape of the truncated object.

In some embodiments, after the entire reconstruction process is completed, the final phase-correlated images can be cropped to the original FOV size before being displayed in order to save memory space.

Processing with an expanded FOV 333 may involve more backprojection and forward-projection operations than processing with the original (smaller) FOV 331. This will result in increased processing times. In the radiotherapy environment, the patient support may often be the main truncated object. In this case, some of the expanded reconstruction may be avoided by selectively ignoring some pixels in the expanded region. For example, the voxels 332 may not contain any meaningful information, and may be skipped during backprojection and forward projection operations. Instead, a smart region 334 illustrated by the shaded area in FIG. 3 may be selected for backprojection and forward projection operations.

The scenario 350 in FIG. 3 shows a sagittal view of a prior image in the axial direction. The prior image reconstructed based on the original projections may have a nominal FOV 352. The large FOV reconstruction approach may extend the nominal FOV 352 in the axial (z) directions to the extended FOV 354 region (e.g., the rectangular shown in the axial direction scenario 350). The extrapolation operation in the axial direction may be accomplished by expanding the columns in the original projections with predetermined or constant values, or values from the nominal FOV 352. The smart region in the axial direction may be the shaded extension regions 353 plus the nominal FOV region 352.

Figure 4:
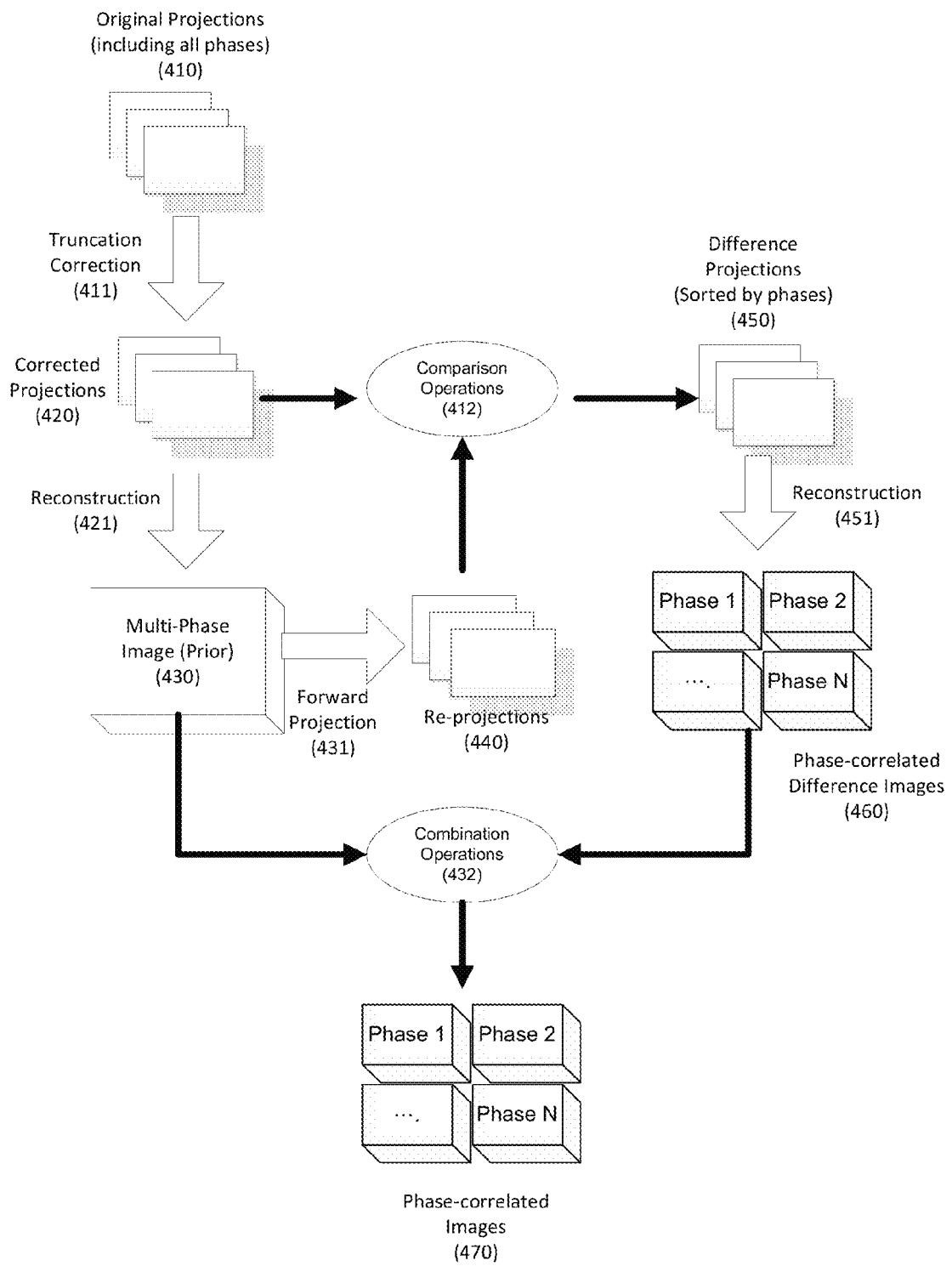
FIG. 4 shows a flow diagram illustrating another embodiment of a process for generating one or more phase-correlated images.

FIG. 4 shows a flow diagram illustrating another embodiment of a process for generating one or more phase-correlated images. Some of the operations in FIG. 4 are similar to the operations illustrated in FIG. 2 and discussed above. For example, original projections 410, corrected projections 420, a reconstruction operation 421, a multi-phase image 430, a forward projection operation 431, difference projections 450, a reconstruction 451, and phase-correlated difference images 470 correspond to the original projections 210, the corrected projections 220, the reconstruction operation 221, the multi-phase image 230, the forward projection operation 231, the difference projections 250, the reconstruction 251, and the phase-correlated difference images 270, respectively.

On the other hand, unlike the truncation correction operation 211 of FIG. 2, a truncation correction operation 411 of FIG. 4 may use a large FOV subtraction approach or a filtering approach to remove the contribution from anything outside a nominal FOV, so that original projections do not require special consideration in reducing artifacts in subsequent processing. The details of the large FOV subtraction approach and the filtering approach are further described below. In addition, unlike the comparison operations 212 of FIG. 2, in which the original projections 210 are compared with the re-projections 240, comparison operations 412 of FIG. 4 may be performed between corrected projections 420, but not between the original projections 410 and re-projections 440. In other words, after the truncation correction operation 411, the original projections 410 are not used in the process of generating phase-correlated images 470.

Figure 5:
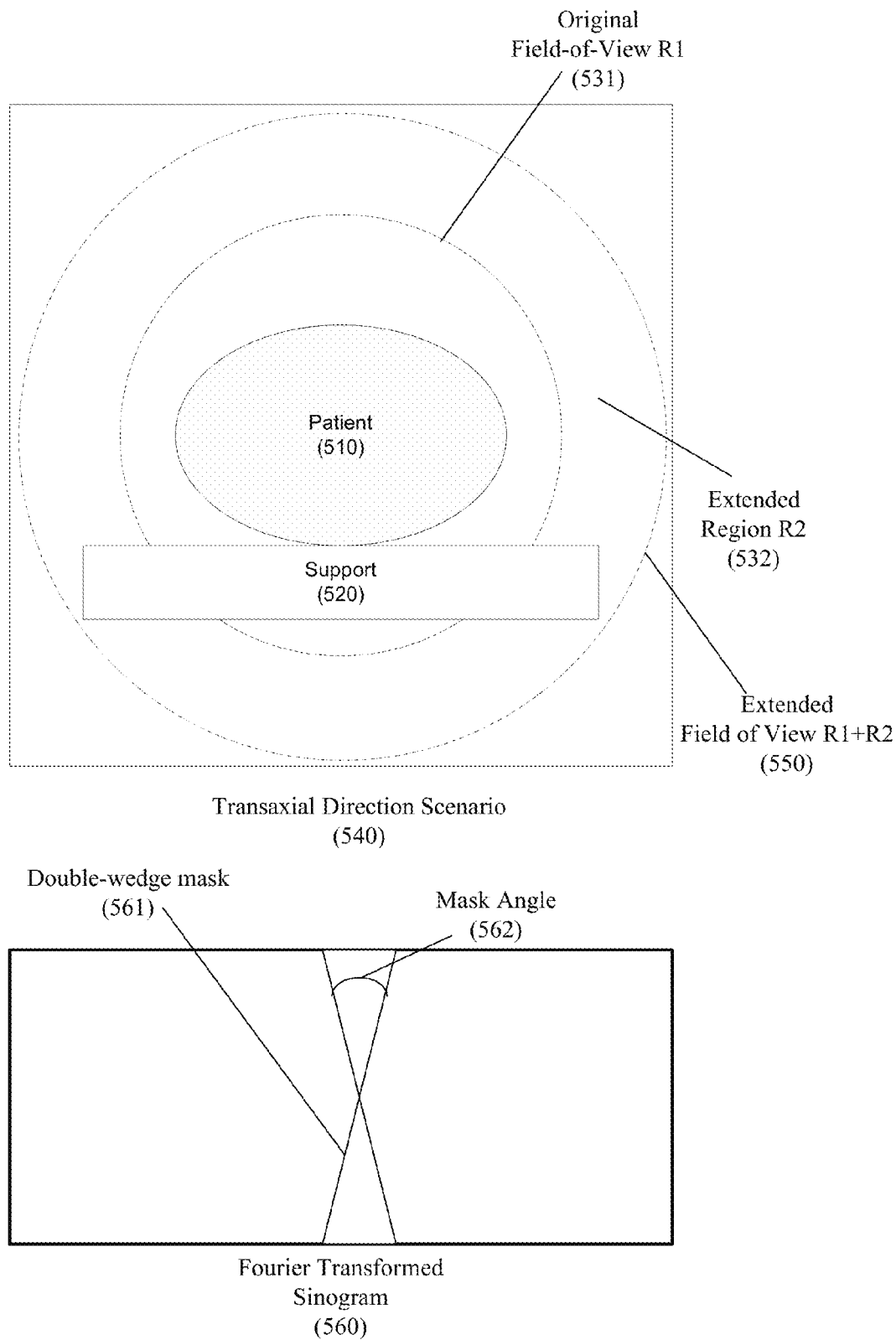
FIG. 5 shows scenarios illustrating various embodiments of the large field-of-view subtraction approach and the filtering approach.

FIG. 5 shows scenarios illustrating various embodiments of the large field-of-view subtraction approach and the filtering approach. In some embodiments, the large FOV subtraction approach as illustrated by a scenario 540 is designed for truncation correction in the transaxial direction. The filtering approach as illustrated by the Fourier-transformed sinogram 560 may be designed for correcting truncations in fan-beam data.

The scenario 540 shows a cross-sectional view of a patient 510 lying on the top of a support 520 in a transaxial direction. An original or a nominal FOV 531 (denoted R1) is similar to the nominal FOV 331 of FIG. 3. A portion of the support 520 may be outside of the nominal FOV 531. The original projections may first be extended using the aforementioned extrapolation approaches. The extended projections may be used to reconstruct a prior image that has an extended FOV 550 which may encompass the patient 510 as well as the entire support 520. Further, the region beyond the nominal FOV 531 may be denoted as an extended region R2 532. Therefore, the extended FOV 550 may cover R1+R2.

In some embodiments, the large FOV subtraction approach may include backprojecting and forward-projecting the extended regions R2 532 to generate a set of estimated projections. Specifically, the extended region R2 532 may be backprojected to reconstruct an expanded image with an annular shape. The annular-shaped expanded image may be used to generate "error" projections by forward-projecting over the nominal FOV R1 using the same projection angles in the original projections. Thus, the error projections may cover a projection space similar to the nominal FOV R1 531 and may contain image data (e.g., artifacts) in the nominal FOV R1 531 that are caused by truncated objects in the extended region R2 532.

Subsequently, the error projections may be subtracted from the original projections, and the artifacts caused by a portion of the support 520 may be removed from the original projections. The result may be deemed the corrected projections, which may be used in lieu of the original projections for subsequent processing. Compared to the corrected projections 220 in FIG. 2, the corrected projections 420 may have less data volume, which would reduce the amount of calculations that may be necessary for the subsequent processing.

In some embodiments, it is also possible to backproject both R1 and R2 regions and then zero out region R1 in order to obtain the annular-shaped reconstructed image. Specifically, the extended FOV R1+R2 550 may be backprojected to reconstruct an expanded image. The expanded image may have the values in the R1 region removed or reassigned with a predetermined or constant value, resulting an extended image with an annular shape. The annular-shaped expanded image may be subsequently used in the above manners.

In some embodiments, the filtering approach may utilize a filter to remove or reduce the effects of the out-of-FOV objects. The filtering approach may de-truncate the projection data using the frequency-distance relation in the 2-D or 3-D Fourier decomposition of a sinogram. For example, for an arbitrary point in the projection space, the 2-D Fourier transform of its sinogram trajectory has a double-wedge shape with a significant amount of energy concentrated along the edges of the wedges. In other words, when a 2D or 3D-formatted sinogram is Fourier-transformed and stored in a rectangular-shape data structure such as a Fourier-transformed sinogram 560, the double-wedge area 561 may correspond to the projection data that are outside of the nominal FOV R1 531, and the angle 562 may correspond to the diameter of the nominal FOV R1 531.

Using this relationship, a frequency domain filter may be designed to reduce the presence of out-of-FOV objects. For a fan beam geometry, the wedge filter essentially removes the data that are located inside of the double-wedge area 561. Specifically, a sinogram may have a vertical axis corresponding to the projection angle, and a horizontal axis corresponding to the detector position in the transaxial direction. Assume that ζ and k are the frequency variables for the transaxial position axis and projection angle axis of the sinogram, respectively. L and D are the source-to-isocenter distance and the isocenter-to-detector distance, respectively, and $r_p$ is the radius of the reconstruction FOV. The wedge filter may be shown as the following evaluation, and any values in Fourier-transformed sinogram 560 that satisfy the following evaluation would be filtered.

$$\left|\frac{k}{k-\zeta(L+D)}\right| > \frac{r_p}{L}.$$

In some embodiments, after the filtering, the Fourier-transformed sinogram 560 may be transformed back to the sinogram-format as a new sinogram with truncation corrected. Further, when the above double-wedge filter is applied to fan-beam data exacted from the central row of the cone-beam data using a filter design derived from the full-fan geometry, the new sinogram may show that the presence of the support 520 may be significantly diminished.

The cone-beam projection data may be sorted into $N_{da}$ sinograms where $N_{da}$ is the number of detectors in the axial direction (i.e., the number of detector rows). Each of these sinograms may be processed using the same double-wedge filter as for the central row the detector; or each sinogram may be processed using alternative wedge filters designed for the cone-beam geometry. Once each sinogram is processed the data are re-sorted into the original projection format for reconstruction using, for example, filtered backprojection.

As with the large FOV subtraction method, the original projections are pre-processed to generate the corrected projections which then replace the original projections in subsequent reconstruction steps. This approach may require that all the original projections be available before reconstruction can commence. However, for a reconstruction process that should be completed as soon as possible after data acquisition stops, the double wedge filter may be applied to the difference projections, allowing the prior image to be reconstructed as soon as the first original projection is acquired.

Figure 6:
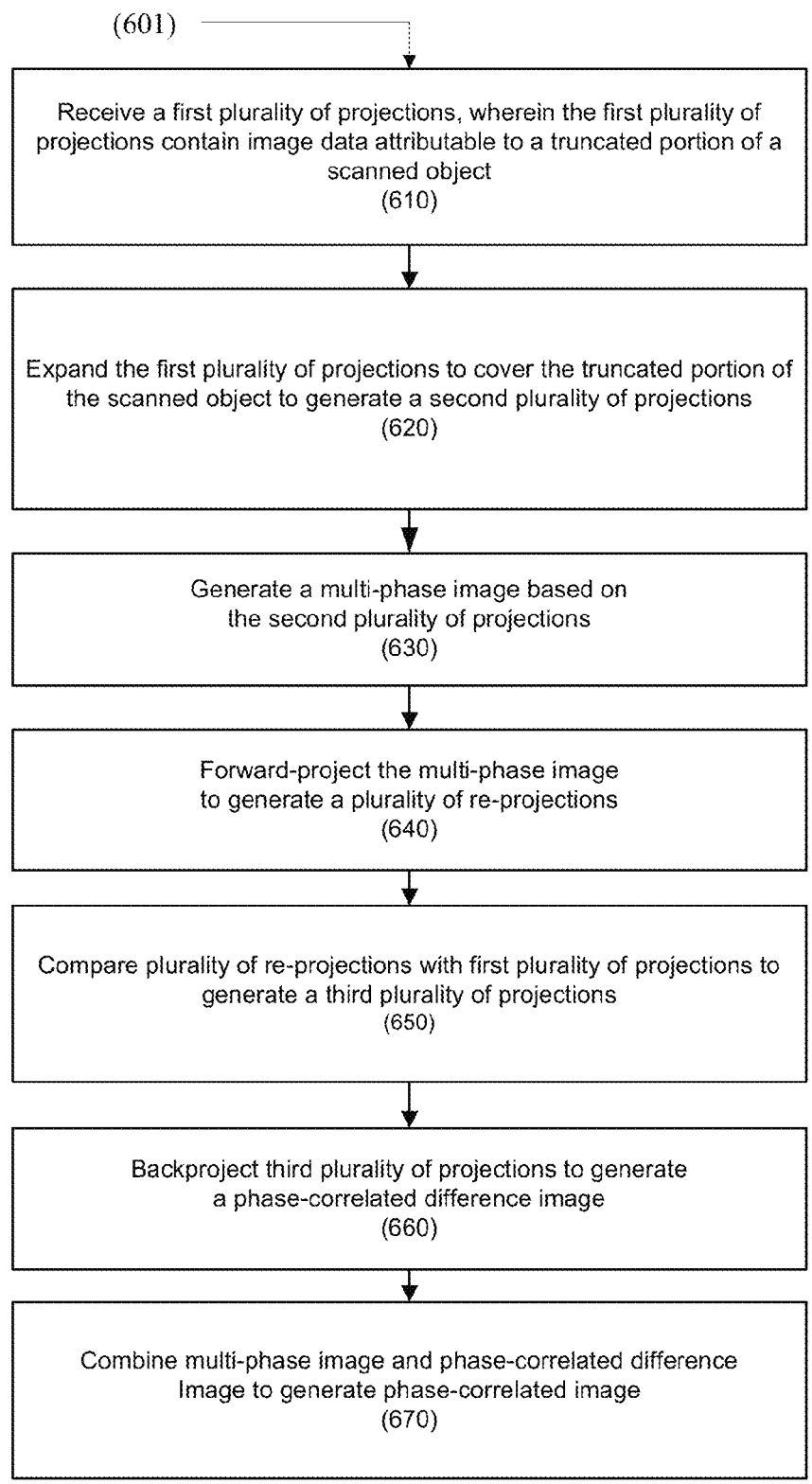
FIG. 6 shows a flow diagram illustrating one embodiment of a process for generating phase-correlated images using the large field-of-view reconstruction approach.

FIG. 6 shows a flow diagram illustrating one embodiment of a process 601 for generating phase-correlated images using a large field-of-view reconstruction approach. The process 601 sets forth various functional blocks or actions that may be described as processing steps, functional operations, events, and/or acts, which may be performed by hardware, software, and/or firmware. Those skilled in the art in light of the present disclosure will recognize that numerous alternatives to the functional blocks shown in FIG. 6 may be practiced in various implementations.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. Moreover, one or more of the outlined steps and operations may be performed in parallel.

At block 610, a medical imaging device may acquire a first plurality of projections for a patient's body. The first plurality of projections may contain CT data obtained through multiple motion phases. The following descriptions will use respiratory phases as example motion phases for illustrative purposes. Further, the first plurality of projections may be affected by a truncated portion of a scanned object (e.g., a corner of a patient support). In other words, the first plurality of projections may contain image data (e.g., artifacts) attributable to the truncation portion of scanned object.

At block 620, an image enhancement server (or alternatively, the same medical imaging device) may receive the first plurality of projections and expand/extrapolate the first plurality of projections to cover the scanned object, including the truncated portion of the scanned object. The image enhancement server may utilize a large FOV reconstruction approach to extrapolate the extended projection data based on the first plurality of projections to generate a second plurality of projections.

When the first plurality of projections are truncated in an axial direction, the expansion operation may be performed by replicating pixel values of certain predetermined values or the pixel values from the first plurality of projections, or using other extrapolation techniques. When the first plurality of projections are truncated in a transaxial direction, the expansion operation may be performed by using linear or non-linear extrapolation formulas based on the pixel values from the first plurality of projections. Further, the extrapolation may use pixel values based on an estimated or known shape of the portion of the scanned object.

At block 630, the image enhancement server may generate a multi-phase image (also referred to as a prior image) based on the second plurality of projections. The image enhancement server may backproject each of the second plurality of projections to generate a model structure and combine the model structures into the multi-phase image. The multi-phase image may contain data associated with multiple respiratory phases. Further, the multi-phase image may have an extended FOV supported by the extrapolated projection data in the second plurality of projections.

At block 640, the image enhancement server may forward-project the multi-phase image to generate a plurality of re-projections. The plurality of re-projections may correspond to the first plurality of projections.

At block 650, the plurality of re-projections may be compared with the first plurality of projections to generate a third plurality of projections (e.g., a plurality of difference projections). Specifically, each projection selected from the first plurality of projections may be compared with a corresponding re-projection selected from the plurality of re-projections.

At block 660, the third plurality of projections may be sorted by respiratory phase. The image enhancement server may backproject the third plurality of projections belonging to a specific respiratory phase to generate a phase-correlated difference image.

At block 670, the phase-correlated difference image may be combined with the multi-phase image to generate a phase-correlated image, which may have motion-induced streaks reduced or removed.

Figure 7:
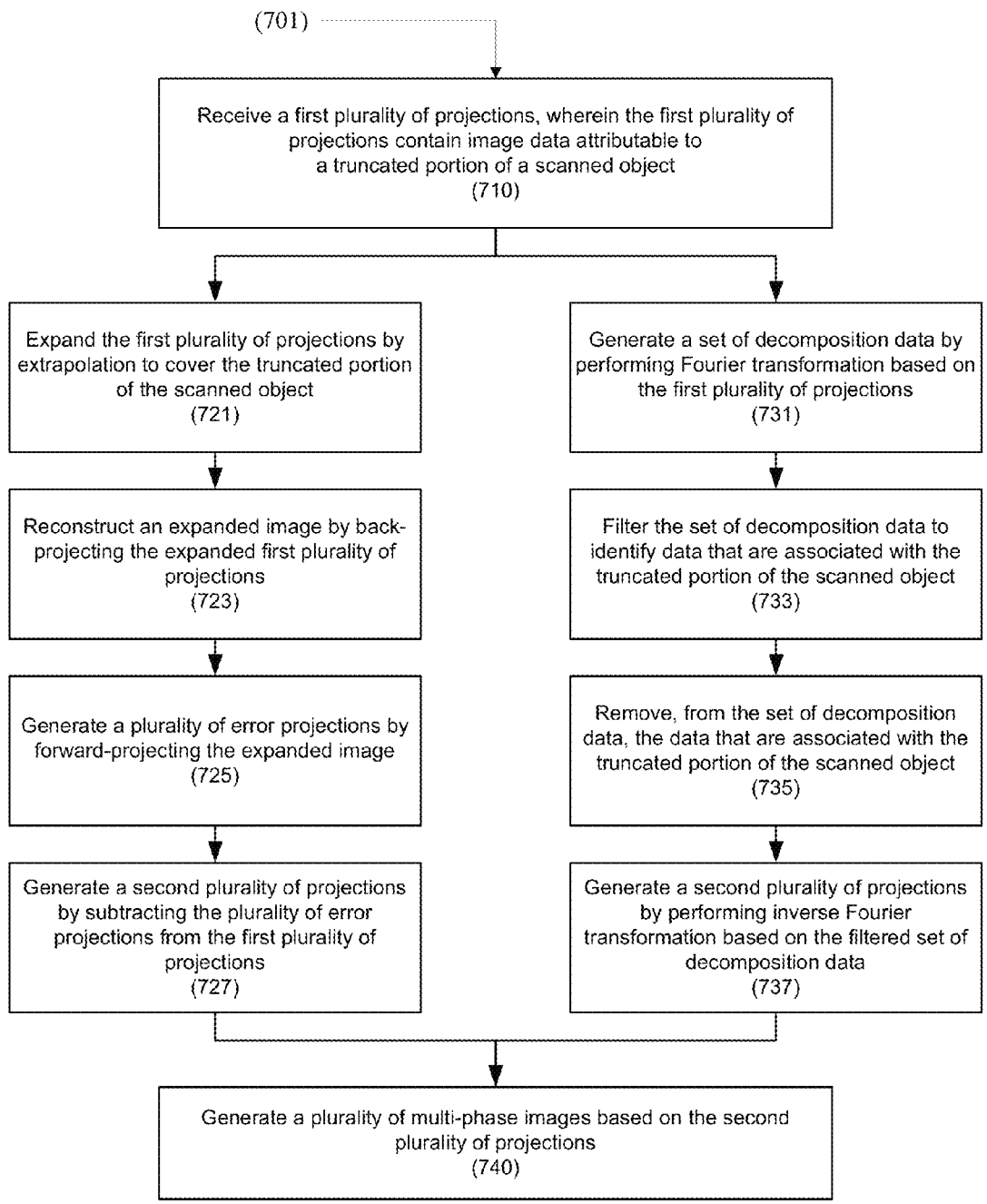
FIG. 7 shows a flow diagram illustrating one embodiment of a process for generating phase-correlated images using the large field-of-view subtraction approach and the filtering approach.

FIG. 7 shows a flow diagram illustrating one embodiment of a process 701 for generating phase-correlated images using the large field-of-view subtraction approach and the filtering approach. The process 701 sets forth various functional blocks or actions that may be described as processing steps, functional operations, events, and/or acts, which may be performed by hardware, software, and/or firmware. Those skilled in the art in light of the present disclosure will recognize that numerous alternatives to the functional blocks shown in FIG. 7 may be practiced in various implementations.

At block 710, an image enhancement server may receive a first plurality of projections. The first plurality of projections may contain CT data obtained through multiple motion phases. Further, the first plurality of projections may contain image data (e.g., artifacts) that may be attributable to a truncated portion of a scanned object.

In one embodiment, blocks 721, 723, 725, and 727 illustrate a large FOV subtraction approach for addressing truncation-related issues. In another embodiment, blocks 731, 733, 735, and 737 illustrate a filtering approach for addressing truncation-related issues.

At block 721, the first plurality of projections may be expanded by extrapolation using various approaches described in block 620 of FIG. 6 and above. Assuming the original first plurality of projections may have a projection space similar to the nominal FOV R1 531 of FIG. 5, after the extrapolation operation, the expanded first plurality of projections may have a projection space similar to the extended FOV R1+R2 533 of FIG. 5.

At block 723, the image enhancement server may reconstruct an expanded image by backprojecting the expanded first plurality of projections. The expanded image may encompass the truncated portion of the scanned object.

In one embodiment, an expanded region (e.g., the extended region R2 532 of FIG. 5) in the expanded first plurality of projections, which may be annular-shaped, may be identified. The expanded image may then be reconstructed by backprojecting the identified expanded region.

In another embodiment, the expanded image may have an expanded FOV (e.g., the expanded FOV R1+R2 533 of FIG. 5), and the reconstruction operation may be performed by removing image data from the expanded image that is not in an expanded region of the expanded FOV (e.g., removing image data within the original FOV R1 531). In other words, the expanded image with an annular shape may be reconstructed by removing (i.e., zeroing out) image data associated with R1 from image data associated with R1+R2.

At block 725, the image enhancement server may generate a plurality of error projections by forward-projecting the expanded image.

At block 727, the image enhancement server may subtract the plurality of error projections from the first plurality of projections to generate a second plurality of projections.

In some embodiments, the image enhancement server may select a filtering approach to address truncation-related issues based on the first plurality of projections. According to an example filtering approach, at block 731, the first multi-phase image may be configured to generate a set of decomposition data by performing Fourier transformation based on the first plurality of projections. Specifically, for each of the first plurality of projections, the Fourier-transformed decomposition data may be stored in a rectangular format.

At block 733, the image enhancement server may be configured to filter the set of decomposition data to identify data that are associated with the truncated portion of the scanned object. In some embodiments, a double-wedge filter may be used.

At block 735, the image enhancement server may be configured to filter the set of decomposition data by removing, from the set of decomposition data, the data that are associated with the truncated portion of the scanned object. Specifically, any data that are filtered by the double-wedge filter may either be removed, or be assigned with a predetermined or constant value.

At block 737, the image enhancement server may be configured to generate a second plurality of projections by performing inverse Fourier-transformation operations based on the filtered set of decomposition data. The inverse Fourier-transformation may convert the decomposition data back to the original projection-format (i.e., Radon space).

At block 740, the second plurality of projections generated either via the blocks 721, 723, 725, and 727, or via the blocks 731, 733, 735, and 737 may be used to generate a plurality of phase-correlated images, in a process that is similar to the blocks 630, 640, 650, 660, and 670 of FIG. 6 and detailed above. In some embodiments, the filtering approach may also be applied to the difference projections generated at the block 740. That is, the difference projections may be Fourier transformed, filtered, and inverse Fourier transformed, accordingly.

Thus, methods and systems for performing medical imaging enhancement have been described. The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. Those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or firmware to implement the techniques introduced here may be stored on a non-transitory machine-readable storage medium and may be executed by one or more general-purpose or special-purpose programmable processors. For example, the machine-executable instructions for the process 601 and the process 701 may be stored in memory, executed by a processor, and/or implemented in an image enhancement server, such as the image enhancing server 130 of FIG. 1, a medical imaging device, such as the medical imaging device 110 of FIG. 1, or other imaging enhancement systems. A "machine-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). For example, a machine-accessible storage medium includes recordable/non-recordable media (e.g., read-only memory (ROM), random access memory (RAM), magnetic disk storage media, optical storage media, flash memory devices, etc.)

Although the present disclosure has been described with reference to specific exemplary embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense.

We claim:

1. A method for enhancing an image, comprising:
receiving a first plurality of projections, wherein the first plurality of projections contain computed tomography (CT) data obtained in multiple motion phases and collected within an imaging device's field-of-view (FOV), and the CT data contains artifacts caused by a portion of a scanned object which is located outside of the imaging device's FOV;

prior to performing reconstruction to generate a multi-phase image, generating a second plurality of projections by expanding the first plurality of projections, wherein the second plurality of projections have an extended FOV that covers at least the portion of the scanned object;

generating the multi-phase image based on the second plurality of projections; and generating a phase-correlated image by reducing from the multi-phase image artifacts identified by a phase-correlated difference image, wherein the phase-correlated difference image is reconstructed based on the first plurality of projections and the second plurality of projections and contains the artifacts caused by the portion of the scanned object.

2. The method as recited in claim 1, wherein the expanding of the first plurality of projections comprises
replicating pixel values when the first plurality of projections have truncation in an axial direction.

3. The method as recited in claim 1, wherein the expanding of the first plurality of projections comprises
extrapolating pixel values when the first plurality of projections have truncation in a transaxial direction.

4. The method as recited in claim 1, wherein the expanding of the first plurality of projections comprises
extrapolating pixel values based on a shape of the portion of the scanned object.

5. The method as recited in claim 1, wherein the generating of the plurality of phase-correlated images further comprises:
forward-projecting the multi-phase image to generate a plurality of re-projections;
comparing each projection selected from the first plurality of projections with a corresponding re-projection selected from the plurality of re-projections to generate a third plurality of projections;
constructing the phase-correlated difference image based on the third plurality of projections; and
combining the multi-phase image and the phase-correlated difference image to generate the phase-correlated image.

6. The method as recited in claim 1, wherein the portion corresponds to a truncated portion of the scanned object.

7. The method as recited in claim 1, wherein the multi-phase image has an extended FOV that covers the portion of the scanned object.

8. A method for enhancing an image, comprising:
receiving a first plurality of projections, wherein the first plurality of projections contain computed tomography (CT) data obtained in multiple motion phases and collected within an imaging device's field-of-view (FOV), and the CT data contains artifacts caused by a portion of a scanned object which is located outside of the imaging device's FOV;

prior to performing reconstruction to generate a multi-phase image, generating a second plurality of projections by reducing the CT data from the first plurality of projections, wherein the reduced CT data are associated with an extended FOV that covers at least the portion of the scanned object and contains the artifacts caused by the portion of the scanned object;

generating the multi-phase image based on the second plurality of projections; and generating a phase-correlated image based on the multi-phase image and the second plurality of projections.

9. The method as recited in claim 8, wherein the reducing of the CT data from the first plurality of projections comprises:
expanding the first plurality of projections by extrapolation to cover the portion of the scanned object;
reconstructing an expanded image from the expanded first plurality of projections;
generating a plurality of error projections by forward-projecting the expanded image; and
generating the second plurality of projections by subtracting the plurality of error projections from the first plurality of projections.

10. The method as recited in claim 9, wherein the reconstructing of the expanded image comprises:
identifying an expanded region in the expanded image; and
reconstructing the expanded image by backprojecting the expanded first plurality of projections to the expanded region of the expanded image.

11. The method as recited in claim 10, wherein the expanded image has an extended FOV, and the reconstructing of the expanded image comprises removing data in the expanded image that is not in an expanded region of the extended FOV.

12. The method as recited in claim 8, wherein the generating of the phase-correlated image comprises:
forward-projecting the multi-phase image to generate a plurality of re-projections;
comparing each projection selected from the second plurality of projections with a corresponding re-projection selected from the plurality of re-projections to generate a third plurality of projections;
reconstructing a phase-correlated difference image based on the third plurality of projections; and
combining the multi-phase image and the phase-correlated difference image to generate the phase-correlated image.

13. The method as recited in claim 8, wherein the reducing of the CT data from the first plurality of projections comprises:
generating a set of decomposition data by performing Fourier transformation based on the first plurality of projections;
filtering the set of decomposition data to remove data that are associated with the portion of the scanned object; and
performing inverse Fourier transformation based on the filtered set of decomposition data to generate the second plurality of projections.

14. The method as recited in claim 13, wherein the filtering of the set of decomposition data comprises:
identifying, via a filter, the data that are associated with the portion of the scanned object in the set of decomposition data; and
removing the data in the set of decomposition data with a predetermined value.

15. The method as recited in claim 14, wherein the filter is a double-wedge filter.

16. A non-transitory machine-readable medium containing a set of instructions which, when executed by a processor, causes the processor to:
receive a first plurality of projections, wherein the first plurality of projections contain computed tomography (CT) data obtained in multiple motion phases and collected within an imaging device's field-of-view (FOV), and the CT data contains artifacts caused by a portion of a scanned object which is located outside of the imaging device's FOV;

prior to performing reconstruction to generate a multi-phase image, generate a second plurality of projections by expanding the first plurality of projections, wherein the second plurality of projections have an extended FOV that covers at least the portion of the scanned object;

generate the multi-phase image based on the second plurality of projections; and generate a phase-correlated image by reducing from a multi-phase image artifacts identified by a phase-correlated difference image, wherein the phase-correlated difference image is reconstructed based on the first plurality of projections and the second plurality of projections and contains the artifacts caused by the portion of the scanned object.

17. The non-transitory machine-readable medium as recited in claim 16, containing additional instructions for expanding the first plurality of projections, which when executed by the processor, causes the processor to extrapolate pixel values when the first plurality of projections have truncation in a transaxial direction.

18. The non-transitory machine-readable medium as recited in claim 16, containing additional instructions for expanding the first plurality of projections, which when executed by the processor, causes the processor to extrapolate pixel values based on a shape of the first portion of the scanned object.

19. A non-transitory machine-readable medium having a set of instructions which, when executed by a processor, cause the processor to:

receive a first plurality of projections, wherein the first plurality of projections contain computed tomography (CT) data obtained in multiple motion phases and collected within an imaging device's field-of-view (FOV), and the CT data contains artifacts caused by a portion of a scanned object which is located outside of the imaging device's FOV;

prior to performing reconstruction to generate a multi-phase image, generate a second plurality of projections by reducing the CT data from the first plurality of projections, wherein the reduced CT data are associated with an extended FOV that covers at least the portion of the scanned object and contains the artifacts caused by the portion of the scanned object;

generate the multi-phase image based on the second plurality of projections; and generate a phase-correlated image based on the multi-phase image and the second plurality of projections.

20. The non-transitory machine-readable medium as recited in claim 19, containing additional instructions for reducing the CT data from the first plurality of projections, which when executed by the processor, causes the processor to:

expand the first plurality of projections by extrapolation to cover the portion of the scanned object;

reconstruct an expanded image from the expanded first plurality of projections;

generate a plurality of error projections by forward-projecting the expanded image; and generate the second plurality of projections by subtracting the plurality of error projections from the first plurality of projections.

21. The non-transitory machine-readable medium as recited in claim 19, containing additional instructions for reducing the CT image data from the first plurality of projections, which when executed by the processor, causes the processor to:

generate a set of decomposition data by performing Fourier transformation based on the first plurality of projections;

filter the set of decomposition data to remove data that are associated with the portion of the scanned object; and perform inverse Fourier transformation based on the filtered set of decomposition data to generate the second plurality of projections.

\* \* \* \* \*